United States Patent [19]

Risse

[11] 4,042,185
[45] Aug. 16, 1977

[54] DEVICE FOR RECEIVING A TAPE OF MATERIAL
[75] Inventor: Jean-Claude Risse, Prangins, Switzerland
[73] Assignee: J. Bobst & Fils S.A., Switzerland
[21] Appl. No.: 707,942
[22] Filed: July 23, 1976
[30] Foreign Application Priority Data
  July 29, 1975  Switzerland ............... 009844/75
[51] Int. Cl.² .................................. G03B 17/26
[52] U.S. Cl. ...................... 242/71.7; 242/71.1
[58] Field of Search ............. 242/71.1, 71.7, 71.2
[56] References Cited
  U.S. PATENT DOCUMENTS
  2,484,248  10/1949  Roehrl ................. 242/71.1
  3,104,847   9/1963  Miller ................. 242/71.7
  3,288,388  11/1966  Winkler ................ 242/71.1
  3,356,311  12/1967  Winkler ................ 242/71.1

FOREIGN PATENT DOCUMENTS
  1,073,297   1/1960  Germany ............... 242/71.7

Primary Examiner—Edward J. McCarthy
Attorney, Agent, or Firm—Hill, Gross, Simpson, Van Santen, Steadman, Chiara & Simpson

[57] ABSTRACT

A device for receiving a tape of material characterized by a closed case having a light-tight chamber in communication with the exterior of the chamber by a channel provided with light shutters, a tape supporting arrangement comprising a plurality of reels mounted for rotation in the chamber on an axle, at least one spring element for continuously pressing a tape onto the reels as it is fed into the chamber, and a guiding device disposed on the chamber for laterally guiding the tape as it is being wound on the reels. In order for the device to handle tapes of different widths, the guiding device includes a pair of disks disposed at opposite ends of the plurality of reels and at least one retractable guide member pivotably mounted on the axle between a pair of reels to move between a retracted position withdrawn within the circumference of the reels to an extended position with a portion extending beyond the periphery of the reels.

9 Claims, 3 Drawing Figures

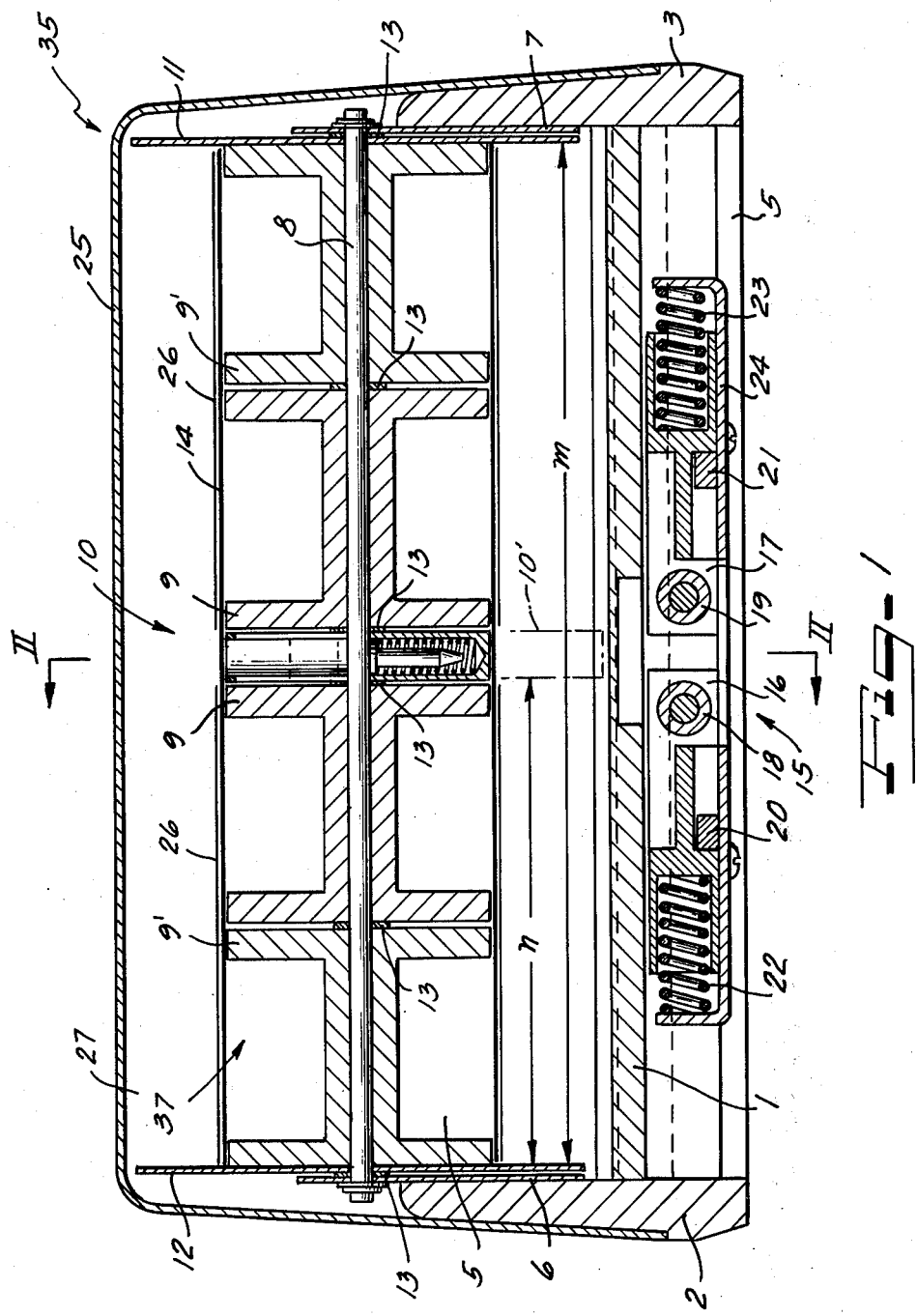

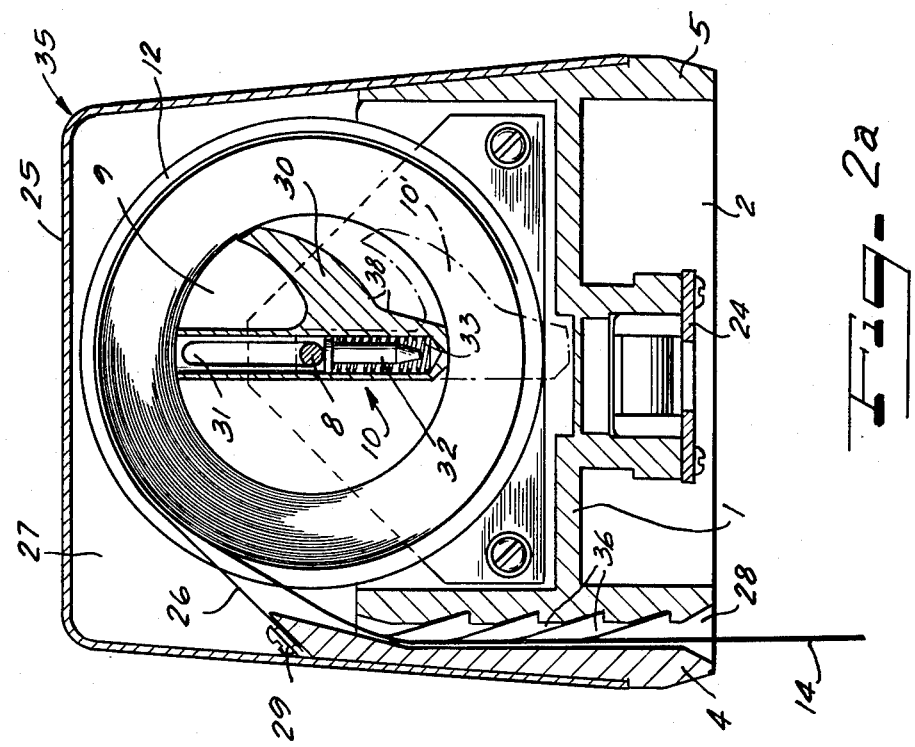
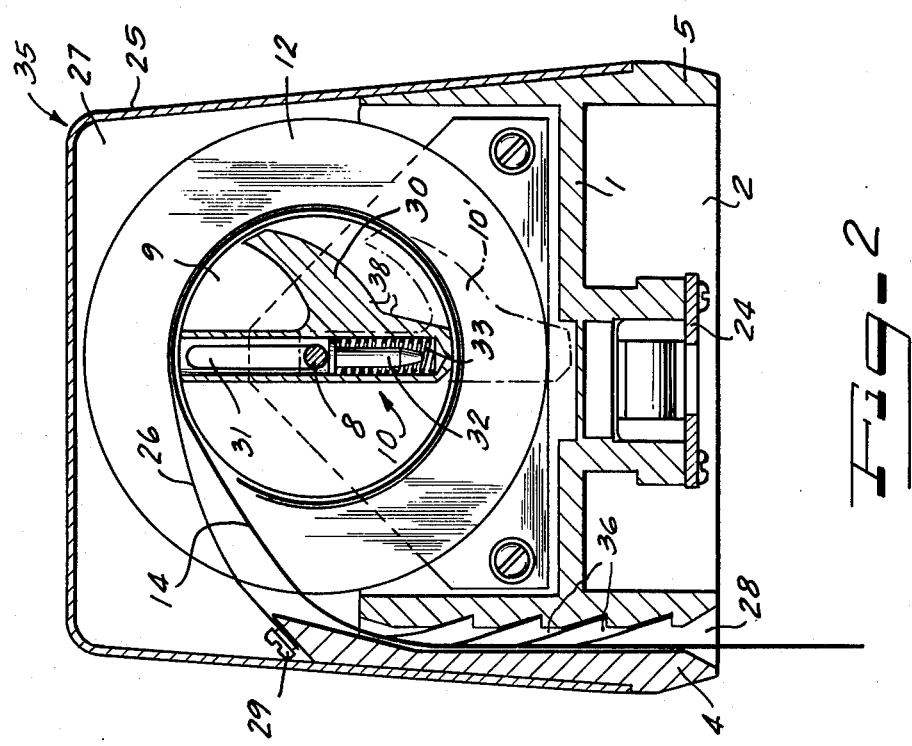

DEVICE FOR RECEIVING A TAPE OF MATERIAL

BACKGROUND OF THE INVENTION

1. Field of the Invention

The present invention is directed to a device or magazine for receiving a tape of material such as an exposed photographic film or exposed photographic paper in a light-tight chamber of a closed case which chamber is in communication with the exterior through a tape introduction channel.

2. Prior Art

In one example of a known device for receiving tape such as exposed photographic film, the exposed film is introduced into a dark chamber or camera obscura of a magazine through a channel provided with shutters to prevent any penetration of light into the chamber. The exposed film is then guided for subsequent coiling or winding up by an inner curved surface of a flat spring. The spring is made in such a way that it will partially adapt itself to the configuration of the film during the winding-up operation. However, such a process of winding-up the film involves certain drawbacks with the principle ones being the relative short length of exposed film which can be wound-up within the spring as well as the great resistance of the film to any advance motion after winding-up of a certain length of the film. In fact, during the winding-up of the film, the film must overcome the resistance of the spring changing its shape according to the amount of film that has been previously wound-up in the coil. The film has the tendency to wind itself up by following an inner diameter of a definite dimension. Consequently, the coil of film which builds up will bring about an increase of the outer coil diameter and cause obvious difficulties in the determination of a mechanical characteristic and the curvature to be given to the spring.

On the other hand, winding-up or coiling of a strip of film, which is narrower than the maximum width that can be handled in the device, will produce additional difficulties. During winding-up of such a narrow film, the film will have a tendency to wind-up against the surface of the spring in a helical manner.

SUMMARY OF THE INVENTION

The present invention is directed to a device which allows the winding-up of a great length of tape material by facilitating the advance of the tape and by guiding the tape during the winding-up operation.

To accomplish these tasks, a device or magazine for receiving a tape of material such as an exposed photographic film or an exposed photographic paper has a closed case having a light-tight chamber and a feed channel provided with a shutter in communication with the chamber with the improvements comprising means for supporting a tape in the chamber during a winding of the tape, said means for supporting being disposed in the chamber for rotation about an axis, means disposed in the chamber for continuously pressing the tape against the means for supporting the tape and means for laterally guiding the tape as it is being wound on the means for supporting.

The means for continuously pressing the tape consists of at least one flat spring element mounted on an interior of the chamber. The means for supporting the tape preferably comprises a plurality of reel members arranged side-by-side for rotation on an axle disposed in the chamber.

The means for laterally guiding includes a disk disposed at each end of the means for supporting, a retractable guide member, and means for pivotably mounting the retractable guide member between the two disks which means includes a spring urging the guide member to an extended guide position so that said means for guiding can laterally guide both wide and narrow tapes. Preferably, the means for pivotably mounting the guide member mounts the guide member on the axle of the means for supporting between a pair of reel members with the retracted position of the guide member being within the circumference of the reel members and the extended guide position having a portion of the member extending beyond the periphery of the reel members.

BRIEF DESCRIPTION OF THE DRAWINGS

FIG. 1 is a length-wise cross-sectional view of a device according to the present invention;

FIG. 2 is a cross-sectional view taken along line II—II of FIG. 1 and represents a tape in the initial phase of the winding-up operation; and FIG. 2a is a cross-sectional view identical to the view of FIG. 2 after a substantial length of the tape has been wound-up within the device.

DESCRIPTION OF THE PREFERRED EMBODIMENT

The principles of the present invention are particularly useful in a device or magazine generally indicated at 35 in the figures. The device 35 is formed of a pad 1 having side wall members 2 and 3 secured to its ends and front and rear walls, which is illustrated in FIGS. 2 and 2a, are integral with the pad 1. A hood 25 is secured to the outer surfaces of the walls 2, 3, 4 and 5 to form a light-tight chamber or camera obscura 27. To enable insertion and removal of a tape such as 14 into and out of the chamber 27, the front wall 4 has an infeed channel 28 (FIG. 2) which is provided with a plurality of shutters 36 to prevent light from entering the chamber 27.

Means 37 for supporting the tape or film 14 is disposed in the chamber 27. To support the means 37 for rotation, two supports 6 and 7 (FIG. 1) are secured to the side walls 2 and 3. Both of the suppports 6 and 7 are provided with an aperture which serves as a bearing for receiving an axle 8 of means 37 for supporting the tape 14. As illustrated in FIG. 1, the axle 8 receives several reel members 9 of the means 37 for supporting a tape or film 14 in a side-by-side axial alignment and as illustrated in FIG. 1 two reel members 9 are disposed on opposite sides of a guiding means or device 10. Two guiding disks 11 and 12 are disposed on opposite ends of the means 37 for supporting and engage the outer ends of the reel members 9'. To ensure spacing between each of the reel members 9 between the reel members 9 and the guiding device 10 and the guiding disks 11 and 12 and the supports 6 and 7, a plurality of spacing or intermediate rings such as washers 13 are provided.

To facilitate mounting of the device 35, the pad 1 on a lower surface is equipped with a fastening system 15 which as illustrated includes two locks 16 and 17, each of which supports a roller 18 and 19, respectively. The two locks 16 and 17 are received in a slide way formed by the bottom surface of pad 1 and a closing plate 24 secured to the pad 1. The two locks 16 and 17 are biased against stops such as 20 and 21 by springs 22 and 23 which act between turned-up end portions of the closing plate 24 and each lock 16 and 17.

As best illustrated in FIGS. 2 and 2a, the film or tape 14 is introduced into the light-tight chamber 27 through the channel 28 which is provided in the front wall 4. Movable springs 26 are secured on a front wall 4 by means of screws 29 and each spring 26 is a flat-type spring which is curled around the periphery or circumference of the reel members 9. As illustrated, the spring members or elements 26 guide the film 14 so that it will be wound on the peripheries of the reel members 9. It should be pointed out that, for purposes of illustration, spacing is provided between each spring 26 and the film 14 as well as between the film 14 and the peripheries of the reel members 9; however, in reality, a close contact between the film 14, the peripheries of the reel members 9 and the springs 26 will occur. The springs 26 should preferably have sufficient flexibility to enable pressing the film against the peripheries of reels 9 during the beginning of the wind-up operation and against the layer of the film already wound on the reel members when the winding operation has proceeded beyond the beginning such as illustrated in FIG. 2a.

The guiding device 10, which along the guiding disks 11 and 12, form means for laterally guiding a tape, enable the device 35 to receive tapes of films of different widths and to laterally guide each width. As illustrated in FIG. 1, the device 35 can receive a film or tape 14 having a maximum width $m$ and the disks 11 and 12 will provide lateral guiding for the wide tape. To provide lateral guiding of a narrow tape having a width $n$ which is less than width $m$, the guiding device 10 when in an extended position 10' coacts with one of the guiding disks such as 12. Each spring element 26 has a width less than the axial distance between the guiding disks and a facing surface of the guiding device 10 and this width is approximately $n$ or less so that each spring 26 may go between the disk and the guide device in the extended position 10'.

The guiding device 10 comprises a retractable guide member 30 which has an elongated slot 31 which receives the axle 8 to pivotably mount the guide member 30 on the axle and allows movement of the member 30 between a retracted position illustrated in bold lines in FIG. 2 and the extended position 10' illustrated in broken lines in FIG. 2. To urge the guide member 30 to the extended position 10', the mounting means which includes the slot 31 and the axle 8 also includes a spring 33 acting on a rod or spring keeper 32 that bears against the axle 8 to urge the member 30 to the position 10'. Thus, when no film has been introduced into the chamber 27, or a narrow film having the width $n$ (FIG. 1) is being introduced, the guide member 30 will assume the extended position 10'. When a narrow film or tape is introduced, the guide member 30 along with the disk such as 12 will provide lateral guiding means to ensure proper winding and coiling of the narrow film. The guide member 30 has a configuration and an overall length less than the diameter of the reel members 9 so that when it is in the retracted position illustrated in FIGS. 2 and 2a, it is entirely within the circumference of the reel members 9. In addition, the guide member 30 is provided with cam surfaces such as 38. When a film having a width greater than the dimension $n$ such as a full width $m$ is introduced into the chamber 27, the force of the springs 26 acting on the film cause the film and cam surfaces 38 to coact to urge or force the member 30 against the force of the spring 33 to the retracted position as illustrated in FIGS. 2 and 2a.

As the film 14 is wound or coiled on the support means formed by the reels 9, the reels will rotate to facilitate the winding or coiling operation. As illustrated in FIG. 2a, after numerous layers of the film have been wound on the support means formed by the reel members 9, the radius of curvature of the springs 26 will increase and the spring 26 will assume the configuration of the outer surface of the coil. It should be noted that due to rotation of the reel members 9 on the axle 8, the problems with the internal friction between layers of the coil of tape or film 14 of the prior art devices are minimized.

The device 35 can handle either a narrow film having a width of approximately $n$ or a film having a width of the full axial length of the support means such as a width $m$. Thus, the device has greater utilization for handling films of two different widths and due to the provision of the guide means 10, the helical winding with axial displacement between loops of the coil which winding occurred in the prior art devices is eliminated. While the device 35 is illustrated with the guide means 10 disposed substantially at a position of one-half the maximum width $m$, its axial position on the axis can be placed at any desired position to handle different width film. It is also within the scope of this invention to provide more than one guide means 10 which are axially spaced on the axle 8, so that film of at least three different widths can be handled by the same device.

Although various minor modifications may be suggested by those versed in the art, it should be understood that I wish to employ within the scope of the patent warranted hereon, all such modifications as reasonably and properly come within the scope of my contribution to the art.

I claim:

1. In a device for receiving a tape of material such as an exposed photographic film or exposed photographic paper and including a closed case having a light-tight chamber and a tape infeed channel provided with shutters in communication with the chamber, the improvements comprising means for supporting a tape in the chamber during a winding of the tape, said means for supporting being disposed in the chamber for rotation about an axis, means disposed in the chamber for continuously pressing the tape against the means for supporting the tape, and means for laterally guiding the tape as it is being wound on the means for supporting, said means for laterally guiding including a disk disposed at each end of the means for supporting, a retractable guide member, and means for pivotably mounting the retractable guide member between the two disks including a spring urging the guide member from a retracted position to an extended guiding position so that with the guide member in the extended guiding position, a narrow tape will be guided between the guide member and one disk and with the guide member in the retracted position, a wide tape is guided between the pair of disks.

2. In a device according to claim 1, wherein said means for pivotably mounting pivotably mounts the retractable guide member on an axis of said means for supporting.

3. In a device according to claim 1, wherein the means for supporting comprises a plurality of reel members arranged side-by-side for rotation on an axle.

4. In a device according to claim 3, wherein said means for continuously pressing comprises at least one flat spring element.

5. In a device according to claim 1, wherein the means for continuously pressing the tape against the means for supporting comprises at least one flat spring element mounted in said chamber.

6. In a device for receiving a tape of material such as an exposed photographic film or exposed photographic paper and including a closed case having a light-tight chamber and a tape infeed channel provided with shutters in communication with the chamber, the improvements comprising means for supporting a tape in the chamber during a winding of the tape, said means for supporting being disposed in the chamber and comprising a plurality of reel members being arranged side-by-side for rotation on an axle, means disposed in the chamber for continuously pressing the tape against the means for supporting the tape and means for laterally guiding the tape as it is being wound on the means for supporting, said means for guiding including a disk mounted at each end of the axle, at least one retractable guide member and means for mounting each retractable guide member at an axial position between the pair of disks, said means for mounting including a spring biasing the retractable guide member from a retracted position to an extended guiding position so that when the guide member is in the extended position a tape of a narrow width is guided between one of said two disks and the retractable guide member and when a tape having a greater width than said narrow tape is inserted in the device, it urges the retractable guide member to the retracted position.

7. In a device according to claim 6, wherein the means for mounting includes an elongated slot in the guide member, said slot receiving the axle of the means for supporting to pivotably mount the guide member between a pair of reel members, said guide member having a dimension less than the diameter of the reel members so that when it is in the retracted position, it is received within the circumference of the reel members and the spring biases the guide member to an extended position with a portion of the guide member extending passed the circumference of said reel members.

8. In a device according to claim 7, wherein the guide member has cam surfaces engaged by a leading edge of the tape having a width greater than said narrow tape, said cam surface coacting with the leading edge of the tape to move the guide member against the spring to the retracted position.

9. In a device according to claim 7, wherein the means for continuously pressing the tape against the means for supporting comprises at least two flat spring elements mounted in said chamber on opposite sides of the guide member.

* * * * *